Figure 1:
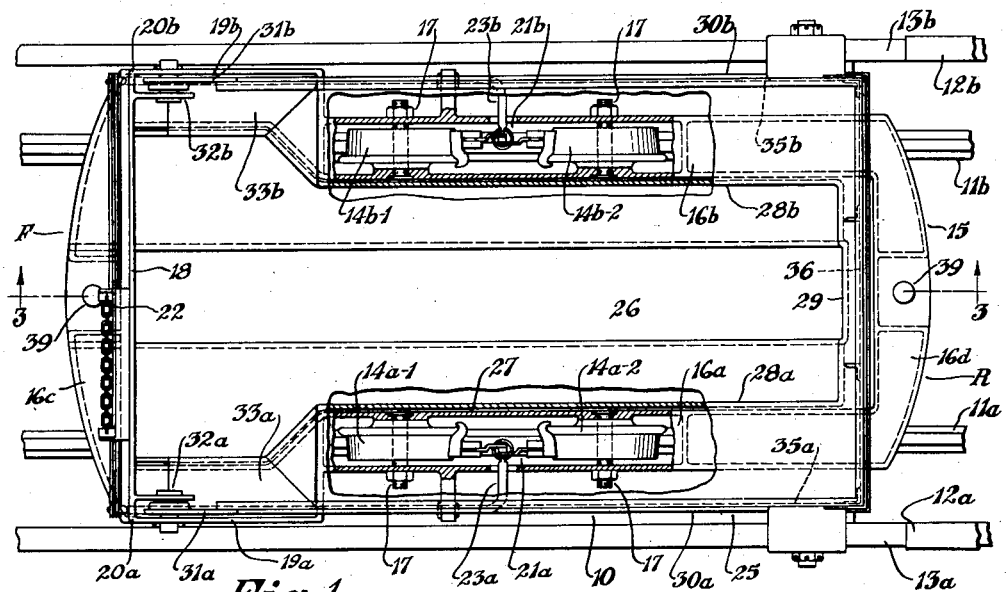

July 10, 1934.    H. J. HICK    1,966,390
DUMP CAR FOR MINES AND THE LIKE
Filed Sept. 11, 1933    2 Sheets-Sheet 1

Inventor
H.J.Hick
By Frease and Bishop
Attorneys

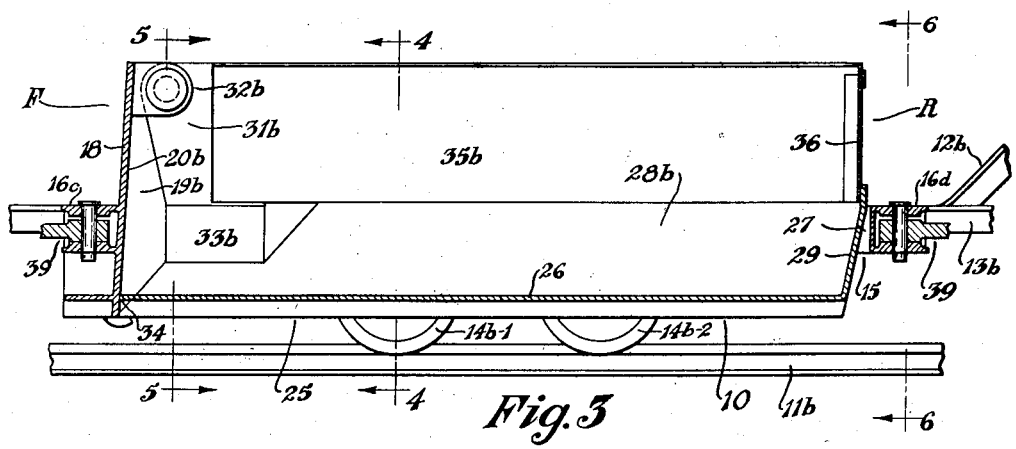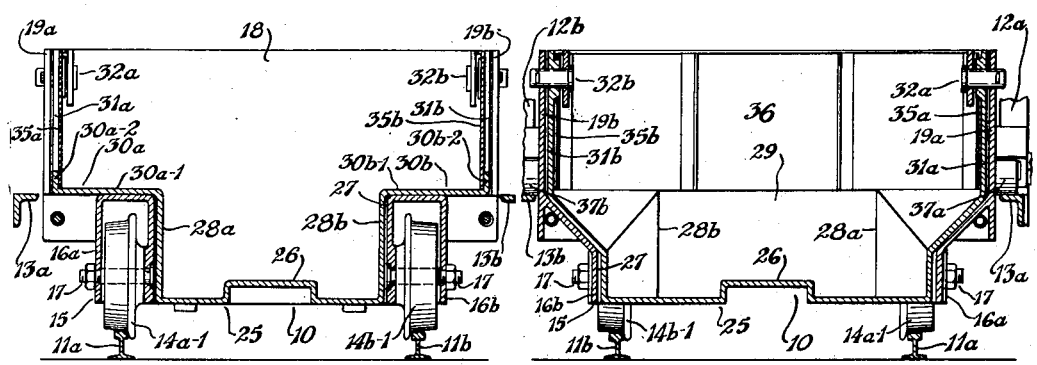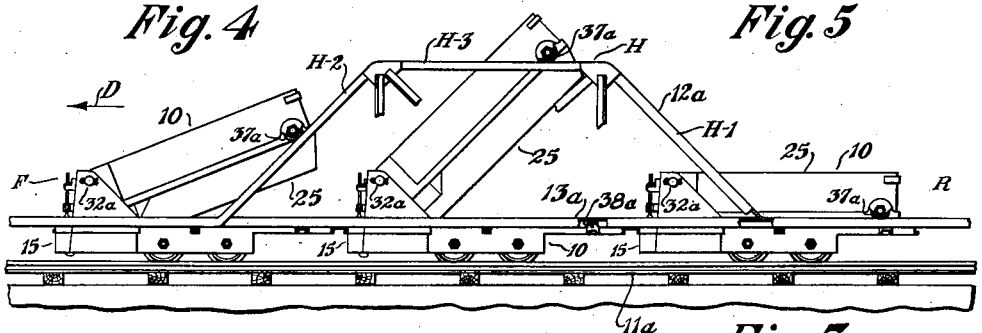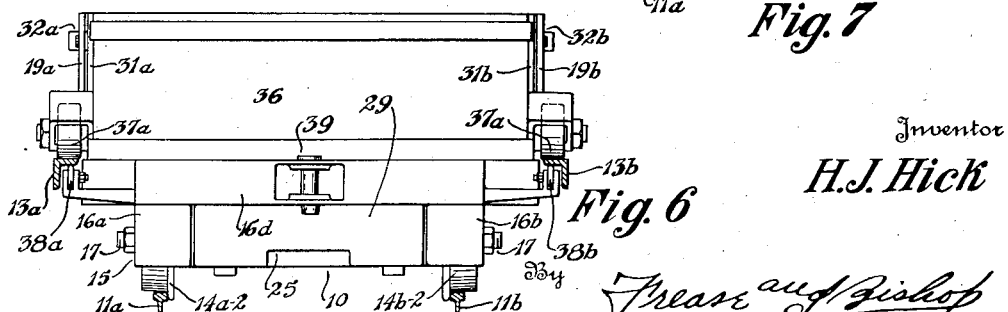

Patented July 10, 1934

1,966,390

UNITED STATES PATENT OFFICE 1,966,390

DUMP CAR FOR MINES AND THE LIKE

Harry J. Hick, Alliance, Ohio, assignor to The Machined Steel Casting Company, Alliance, Ohio, a corporation of Ohio Application September 11, 1933, Serial No. 688,961

12 Claims. (Cl. 105—261)

My invention relates to dump cars for use in mines and the like for transporting materials from one location, as at the point of mining to another location as at a storage pile, bin or the like; and more particularly my invention relates to such cars which include wheels preferably rolling on a track, a frame supported by the wheels, and a dump container operatively mounted on and associated with the frame and adapted for automatic actuation to dump material from the container at the storage pile, bin or the like, while the car is moving along the track.

It is desirable that the dumping action of such a car be as rapid as possible, so that the speed of the car or a train of the cars may be relatively high.

It is also desirable that the dumping action shall not tip the frame and wheels so that the normal movement of the car on the track may not be disturbed.

It is furthermore desirable that the frame and container be of such form and arrangement as to permit integral casting from steel of the frame and of bottom portions or all of the container so as to reduce maintenance costs, which are usually relatively high in mine cars of riveted structural steel construction, because the riveted joints of riveted structural steel cars are banged or jarred loose by the rough usage to which the cars are subjected.

The objects of the present improvements include the provision of an improved automatically actuated dump car of the foregoing general description, and which is so constructed and arranged as to permit very rapid dumping action.

Further objects of the present improvements include the provision of such an automatically actuated dump car, and actuating means therefor, of such nature that the frame and the wheels of the car are not tipped or otherwise disturbed during the dumping action.

Further objects of the present improvements include the provision of a dump car of the foregoing general character, and which may include an integral cast steel frame, and a container including integral cast steel portions, the frame and the container being of such form and arrangement as to permit the operative mounting of the container on the frame to be effected by pivotally mounting the integral portions of the container on the integral frame, so that, particularly in the dumping action of the car, the major portions of the loads imposed upon the container and frame be transmitted through the integral portions of the container and integral frame, thereby avoiding the jarring and loosening action which would be imposed upon riveted container portions operatively mounted on a riveted frame.

The foregoing and other objects are attained by the improvements, apparatus, parts, combinations, and sub-combinations, which comprise the present invention, and the nature of which is set forth in the following general statement, and preferred embodiments of which, together with their mode of use, are set forth in the following description, and which are particularly and distinctly pointed out and set forth in the appended claims forming part hereof.

The nature of the improved dump car of the present invention may be stated in general terms as including preferably four flanged supporting wheels, a preferably cast steel centrally open frame including laterally spaced longitudinally extending sets of side members and longitudinally spaced laterally extending sets of end members, and stub shaft means independently journalling each wheel upon one set of the frame side members, opposite wheels being axially alined with each other.

The frame also preferably includes at one end thereof a laterally and upwardly extending end closure wall, and a supporting and side closure wall extending longitudinally from each side of the end closure wall towards the opposite end of the frame.

In addition to the foregoing, the improved car also includes an open ended container preferably having a cast steel bottom wall of such dimensions as to permit its movement into and out of the central opening of the frame, integral cast steel side walls extending upwardly from the bottom wall, pivot means at opposite upper end corners of the integral side walls pivotally mounting the container to the upper ends of the frame supporting and side closure walls, and a preferably cast steel integral end wall extending between the other ends of the container bottom and side walls.

The container side walls also preferably include outwardly extending ledge portions adapted to normally rest on upper portions of the sets of car frame side members; and in such normal position the frame end and side closure walls close the open end of the container.

A container tilting wheel is rotatably mounted on each container side wall at the end thereof opposite its pivotal mounting on the frame, the tilting wheels being axially alined with each other and being adapted for running over cam tracks provided for tilting the container as the car frame is moved in the normal manner along a usual track.

Anti-tipping or hold-down wheels are operatively mounted on the frame and cooperate with anti-tipping or hold-down tracks for resisting the tipping moment which would otherwise be imposed upon the frame by the pivoting of the container to the frame at upper end corners of the container as aforesaid, such pivotal mounting of the container serving to permit the desired maximum speed in the dumping or tilting action of the container.

The improved dump cars furthermore preferably include improvements in the construction, arrangement, and cooperative association of certain parts as are hereinafter set forth, and/or hereinafter set forth and claimed.

Figure 2:
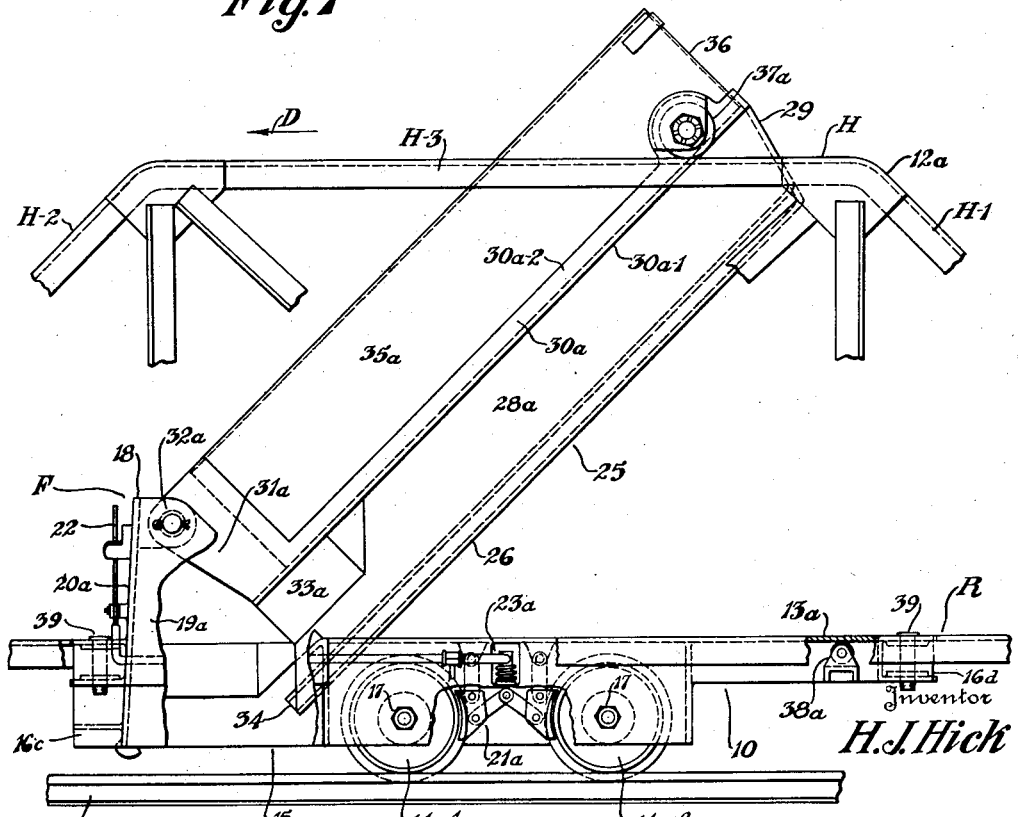

Preferred embodiments of the improved dump car and of the parts thereof, and of the cooperating and associated flanged wheel tracks, tilting cam tracks, and anti-tipping or hold-down tracks are illustrated in the accompanying drawings forming part hereof, in which Figure 1 is a fragmentary plan view illustrating one embodiment of the improved dump car and associated tracks, the container being illustrated in its normal position resting upon the frame, and ready for receiving materials;

Fig. 2, a fragmentary elevation view thereof illustrating the container and associated tracks after the container has been tilted by rolling of the container tilting wheels over the tilting cam tracks, and also illustrating in detail one container hold-down wheel on the car frame operating against one of the hold-down tracks;

Fig. 3, a longitudinal sectional view as on line 3—3, Fig. 1, illustrating the improved car and associated tracks;

Fig. 4, a transverse sectional view thereof as on line 4—4, Fig. 3, and looking in the direction of the arrows on line 4—4, Fig. 3;

Fig. 5, another transverse sectional view thereof as on line 5—5, Fig. 3, and looking in the direction of the arrows on line 5—5, Fig. 3;

Fig. 6, another transverse sectional view of the tracks on line 6—6, Fig. 3, and an end elevation view of the car looking in the direction of the arrows on line 6—6, Fig. 3; and Fig. 7, a fragmentary side elevation with portions broken away and illustrated in section illustrating a train of the improved cars and the associated tracks during dumping action of two of the cars.

Similar numerals refer to similar parts throughout the drawings.

In the drawings, each of the improved dump cars is indicated generally by 10; and the cars 10 are supported and roll on usual tracks 11a and 11b and are operatively associated as hereinafter set forth in detail, with tilting cam tracks 12a and 12b, and with hold-down tracks 13a and 13b.

Each car 10, as illustrated, includes four flanged supporting wheels 14a—1 and 14a—2, and 14b—1 and 14b—2.

Each car 10 furthermore includes a preferably cast steel centrally open frame indicated generally by 15 having laterally spaced longitudinally extending sets of side members 16a and 16b connected at their ends with the ends of longitudinally spaced laterally extending sets of end members 16c and 16d.

Stub shaft means each indicated generally by 17 independently journal each flanged wheel upon one set of the frame side members, the wheels 14a—1 and 14a—2 being journalled on the set of frame side members 16a and the wheels 14b—1 and 14b—2 being journalled on the set of frame side members 16b, and the wheels 14a—1 and 14b—1 being axially alined with each other and being supported and rolling respectively on the tracks 11a and 11b, and the wheels 14a—2 and 14b—2 being axially alined with each other and being supported and rolling respectively on the tracks 11a and 11b.

Each frame 15 also includes at one end F of the frame and car, normally the forward end thereof, a laterally extending end closure wall 18 which also extends upwardly above the level of the upper faces of sets of frame side and end members; and a supporting and side closure wall 19a extends longitudinally from one side 20a of the end closure wall 18 towards the opposite end R, of the frame and car, normally the rear end thereof, and also a supporting and side closure wall 19b extends longitudinally from the other side 20b of the end closure wall 18 towards the end R of the frame and car.

Accordingly the end and side closure walls 18 and 19a and 19b as viewed from above or below are in the form of a U opening towards the end R of the frame and car.

The wheels 14a—1 and 14a—2 are necessarily alined with each other in their planes of rotation, as are the wheels 14b—1 and 14b—2; and the set of frame side members 16a have operatively mounted thereon between the wheels 14a—1 and 14a—2 a set of brake shoe means indicated generally by 21a; and similarly the set of frame side members 16b have operatively mounted thereon between the wheels 14b—1 and 14b—2 a set of brake shoe means indicated generally by 21b; and the brake shoe means 21a and 21b are of a usual construction and mode of operation, and are controlled as by means of a brake lever 22 operatively mounted on the outer face of the frame end closure wall 18, and operatively connected with the brake shoe means 21a and 21b, respectively, as by usual links and levers indicated generally by 23a and 23b.

In addition to the wheels 14a—1, 14a—2, 14b—1, and 14b—2, rotatably supporting and arranged with the frame 15, as above described, each car 10 furthermore includes an upwardly opening container indicated generally by 25 which is also itself open ended at the normally forward end F thereof and of the frame and car.

The container 25 preferably includes a cast steel bottom wall 26 of such dimensions as to permit its movement into and out of the central opening 27 of the frame 15.

Preferably integral cast steel side walls 28a and 28b extend upwardly from the opposite longitudinal sides of the container bottom wall 26 and a preferably cast steel integral end wall 29, located at the normally rear end R of the container, the frame and the car, extends between the similarly located ends of the container bottom and side walls.

In order to minimize the over-all weight of the car, the cast steel container side walls 28a and 28b terminate throughout the major portion of their lengths in outwardly and upwardly extending side flange members 30a and 30b respectively; and the side flange members 30a include an outwardly extending leg flange 30a—1 and an upwardly extending leg flange 30a—2; and similarly the side flange members 30b include an outwarly extending leg flange 30b—1 and an upwardly extending leg flange 30b—2.

Below the flange members 30a and 30b the side walls 28a and 28b are so spaced with respect to each other as to be movable with the container bottom wall 26 into and out of the central opening 27 of the frame 15, and in the normal material receiving position of the container, as best shown in Fig. 4, the leg flanges 30a—1 and 30b—1 rest upon and are supported by the upper faces of the sets of frame side members 16a and 16b.

At the forward end F of the car, the integral cast steel portions of the container 25 include suspending and side closure walls 31a and 31b extending upwardly from the leg flanges 30a—2 and 30b—2; and pivot pin and bracket means 32a and 32b pivotally connect the upper ends of the container suspending and side closure walls 31a and 31b respectively with the upper ends of the frame supporting and side closure walls 19a and 19b, the container side walls and suspending walls being located between and being overlapped by the frame supporting and side closure walls 19a and 19b as best shown in Fig. 1.

The central opening 27 of the frame 15 may be as illustrated enlarged at the forward end F of the car, and the integral container bottom and side walls may be similarly enlarged at the forward end F of the car as illustrated, for attaining maximum capacity of the car.

For facilitating the dumping action of the container, the enlarged portions thereof may include downwardly sloping wall portions 33a and 33b.

The pivotal mounting of the cast integral container portions at the upper end corners thereof upon the upper ends of the frame walls 19a and 19b, permits relatively rapid dumping of the container, since a very slight tilting of the container about its pivot pins causes a relatively large opening to be made between the end 34 of the container bottom wall at the forward or dumping end F of the car, and the frame closure wall 18, as best shown in Fig. 2.

As illustrated, the container 25 also includes plate extension side walls 35a and 35b and a plate extension end wall 36 which may be secured as by welding to the upper portions of the integral container side walls 28a and 29a and the integral container end wall 29, whereby the over-all weight of the container may be minimized as compared with casting the entire container integrally, while at the same time the advantages of the pivotal mounting of integral container walls on the frame are attained.

At the normally rear end R of the car, the container integral side wall 28a has rotatably mounted on its leg flange 30a—2, a tilting roller 37a; and similarly the container integral side wall 28b has rotatably mounted on its leg flange 30b—2, a tilting roller 37b.

The axes of rotation of the tilting rollers 37a and 37b are preferably alined with each other and extend laterally with respect to the longitudinal axis of the car, and the rollers 37a and 37b roll on the upper cam faces of the cam tilting tracks 12a and 12b, whereby when the car is advanced on the supporting tracks 11a and 11b, and the tilting rollers 37a and 37b pass over the hump portions H of the cam tracks 12a and 12b, as shown in Figs. 2 and 7, the container is tilted on the pivoting means 32a and 32b and any material in the container dumps therefrom through the normally forward end of the frame opening 27.

Such tilting of the container on the frame 15 causes a tipping moment to be applied to the frame tending to tip the frame about the normally forward supporting wheels 14a—1 and 14b—1, and to neutralize such tipping moment, at the normally rear end R of the car, the sets of frame side members 16a and 16b have rotatably mounted thereon anti-tipping or hold-down rollers 38a and 38b, which roll against under faces respectively of the anti-tipping or hold-down tracks 13a and 13b, as best shown in Figs. 2 and 6.

The hump portions of the cam tracks 12a and 12b as illustrated include sloping portions H—1 and H—2 extending upwardly from the level of the hold-down tracks 13a and 13b and with a straightway portion H—3 interposed between the upper ends of the sloping portions H—1 and H—2.

The sloping portions H—1 and H—2 of the cam tracks preferably have the same although oppositely directed slopes, so that the containers will be dumped when a train of the cars passes through and over the cam tracks in either direction.

As illustrated the car in Fig. 2 and the train of cars in Fig. 7 are moving in the directions of the arrows D.

A dumping action of the containers will result if the cars as headed in each of Figs. 2 or 7 are moved in the opposite direction, but the preferred direction of movement is as indicated to attain the dumping action with a minimum strain upon the cars.

The cars 10 may be coupled one with another to make up a train by any usual coupling means, such as pin and link means 39.

Each of the cars 10, as thus set forth, may be described in somewhat different and more general terms as including a plurality of supporting wheels 14a—1, 14a—2, 14b—1 and 14b—2, a frame 15, stub shaft means each indicated generally by 17 independently journalling each supporting wheel on the frame, supporting walls 19a and 19b extending upwardly from the frame, a container 25 having a dumping opening at one end and including a bottom wall 26 and longitudinally extending side walls 28a and 28b and an end wall 29 extending between the bottom and side walls at the other end of the container, and pivot means 32a and 32b pivotally mounting the upper corners of the container side walls 28a and 28b adjacent the dumping opening to the upper ends of the frame supporting walls 19a and 19b, respectively.

The tilting rollers 37a and 37b operatively mounted as aforesaid on the frame side walls 28a and 28b may furthermore be described in other terms as comprising cam follower means adapted to coact with the cam track means 12a and 12b for tilting the container with respect to the frame 15; and similarly the hold-down rollers 38a and 38b operatively mounted on the frame 15 as aforesaid may be described in other terms as comprising hold-down means on the frame adapted to coact with the hold-down track means 13a and 13b for preventing tipping of the frame and its supporting wheels.

I claim:

1. A dump car for mines and the like including a plurality of supporting wheels, a frame having a central opening and including laterally spaced longitudinally extending sets of side members and longitudinally spaced laterally extending sets of end members, means independently journalling each wheel upon one set of the frame side members, a laterally and upwardly extending end closure wall at one end of the frame, supporting and side closure walls on the frame, one supporting and side closure wall extending longitudinally from each side of the end closure wall toward the opposite end of the frame, a container having a dumping opening at one end and including a bottom wall and longitudinally extending side walls and an end wall extending between the bottom and side walls at the other end of the container, the container being adapted to be moved into and out of the central opening of the frame, and the container including outwardly extending members adapted to seat upon and be supported by upper members of the frame, and pivot means pivotally mounting the upper corners of the container side walls adjacent the dumping opening to the upper ends of the frame supporting and side closure walls.

2. A dump car for mines and the like including a plurality of supporting wheels, an integral cast frame having a central opening and including laterally spaced longitudinally extending sets of side members and longitudinally spaced laterally extending sets of end members, means independently journalling each wheel upon one set of the frame side members, a laterally and upwardly extending end closure wall at one end of the frame, supporting and side closure walls on the frame, one supporting and side closure wall extending longitudinally from each side of the end closure wall toward the opposite end of the frame, an integral cast container having a dumping opening at one end and including a bottom wall and longitudinally extending side walls and an end wall extending between the bottom and side walls at the other end of the container, the container being adapted to be moved into and out of the central opening of the frame, and the container including outwardly extending members adapted to seat upon and be supported by upper members of the frame, and pivot means pivotally mounting the upper corners of the container side walls adjacent the dumping opening to the upper ends of the frame supporting and side closure walls.

3. A dump car for mines and the like including a plurality of supporting wheels, a frame having a central opening and including laterally spaced longitudinally extending sets of side members and longitudinally spaced laterally extending sets of end members, means independently journalling each wheel upon one set of the frame side members, a laterally and upwardly extending end closure wall at one end of the frame, supporting and side closure walls on the frame, one supporting and side closure wall extending longitudinally from each side of the end closure wall toward the opposite end of the frame, a container having a dumping opening at one end and including a bottom wall and longitudinally extending side walls and an end wall extending between the bottom and side walls at the other end of the container, the container being adapted to be moved into and out of the central opening of the frame, and the container including outwardly extending members adapted to seat upon and be supported by upper members of the frame, pivot means pivotally mounting the upper corners of the container side walls adjacent the dumping opening to the upper ends of the frame supporting and side closure walls, and cam follower means on the container adapted to coact with cam track means for tilting the container with respect to the frame.

4. A dump car for mines and the like including a plurality of supporting wheels, an integral cast frame having a central opening and including laterally spaced longitudinally extending sets of side members and longitudinally spaced laterally extending sets of end members, means independently journalling each wheel upon one set of the frame side members, a laterally and upwardly extending end closure wall at one end of the frame, supporting and side closure walls on the frame, one supporting and side closure wall extending longitudinally from each side of the end closure wall toward the opposite end of the frame, an integral cast container having a dumping opening at one end and including a bottom wall and longitudinally extending side walls and an end wall extending between the bottom and side walls at the other end of the container, the container being adapted to be moved into and out of the central opening of the frame, and the container including outwardly extending members adapted to seat upon and be supported by upper members of the frame, pivot means pivotally mounting the upper corners of the container side walls adjacent the dumping opening to the upper ends of the frame supporting and side closure walls, and cam follower means on the container adapted to coact with cam track means for tilting the container with respect to the frame.

5. A dump car for mines and the like including a plurality of supporting wheels, a frame having a central opening and including laterally spaced longitudinally extending sets of side members and longitudinally spaced laterally extending sets of end members, means independently journalling each wheel upon one set of the frame side members, a laterally and upwardly extending end closure wall at one end of the frame, supporting and side closure walls on the frame, one supporting and side closure wall extending longitudinally from each side of the end closure wall toward the opposite end of the frame, a container having a dumping opening at one end and including a bottom wall and longitudinally extending side walls and an end wall extending between the bottom and side walls at the other end of the container, the container being adapted to be moved into and out of the central opening of the frame, and the container including outwardly extending members adapted to seat upon and be supported by upper members of the frame, pivot means pivotally mounting the upper corners of the container side walls adjacent the dumping opening to the upper ends of the frame supporting and side closure walls, and hold-down means on the frame adapted to coact with hold-down track means for preventing tipping of the frame and its supporting wheels.

6. A dump car for mines and the like including a plurality of supporting wheels, an integral cast frame having a central opening and including laterally spaced longitudinally extending sets of side members and longitudinally spaced laterally extending sets of end members, means independently journalling each wheel upon one set of the frame side members, a laterally and upwardly extending end closure wall at one end of the frame, supporting and side closure walls on the frame, one supporting and side closure wall extending longitudinally from each side of the end closure wall toward the opposite end of the frame, an integral cast container having a dumping opening at one end and including a bottom wall and longitudinally extending side walls and an end wall extending between the bottom and side walls at the other end of the container, the container being adapted to be moved into and out of the central opening of the frame, and the container including outwardly extending members adapted to seat upon and be supported by upper members of the frame, pivot means pivotally mounting the upper corners of the container side walls adjacent the dumping opening to the upper ends of the frame supporting and side closure walls, and hold-down means on the frame adapted to coact with hold-down track means for preventing tipping of the frame and its supporting wheels.

7. A dump car for mines and the like including a plurality of supporting wheels, a frame having a central opening and including laterally spaced longitudinally extending sets of side members and longitudinally spaced laterally extending sets of end members, means independently journalling each wheel upon one set of the frame side members, a laterally and upwardly extending end closure wall at one end of the frame, supporting and side closure walls on the frame, one supporting and side closure wall extending longitudinally from each side of the end closure wall toward the opposite end of the frame, a container having a dumping opening at one end and including a bottom wall and longitudinally extending side walls and an end wall extending between the bottom and side walls at the other end of the container, the container being adapted to be moved into and out of the central opening of the frame, and the container including outwardly extending members adapted to seat upon and be supported by upper members of the frame, pivot means pivotally mounting the upper corners of the container side walls adjacent the dumping opening to the upper ends of the frame supporting and side closure walls, cam follower means on the container adapted to coact with cam track means for tilting the container with respect to the frame, and hold-down means on the frame adapted to coact with hold-down track means for preventing tipping of the frame and its supporting wheels.

8. A dump car for mines and the like including a plurality of supporting wheels, an integral cast frame having a central opening and including laterally spaced longitudinally extending sets of side members and longitudinally spaced laterally extending sets of end members, means independently journalling each wheel upon one set of the frame side members, a laterally and upwardly extending end closure wall at one end of the frame, supporting and side closure walls on the frame, one supporting and side closure wall extending longitudinally from each side of the end closure wall toward the opposite end of the frame, an integral cast container having a dumping opening at one end and including a bottom wall and longitudinally extending side walls and an end wall extending between the bottom and side walls at the other end of the container, the container being adapted to be moved into and out of the central opening of the frame, and the container including outwardly extending members adapted to seat upon and be supported by upper members of the frame, pivot means pivotally mounting the upper corners of the container side walls adjacent the dumping opening to the upper ends of the frame supporting and side closure walls, cam follower means on the container adapted to coact with cam track means for tilting the container with respect to the frame, and hold-down means on the frame adapted to coact with hold-down track means for preventing tipping of the frame and its supporting wheels.

9. A dump car for mines and the like including a plurality of supporting wheels, a frame, means journalling the wheels on the frame, supporting walls extending upwardly from the frame, a container having a dumping opening at one end and including a bottom wall and longitudinally extending side walls and an end wall extending between the bottom and side walls at the other end of the container, pivot means pivotally mounting the upper corners of the container side walls adjacent the dumping opening to the upper ends of the frame supporting walls, and hold-down means on the frame adapted to coact with hold-down track means for preventing tipping of the frame and its supporting wheels.

10. A dump car for mines and the like including a plurality of supporting wheels, a frame, means journalling the wheels on the frame, supporting walls extending upwardly from the frame, a container having a dumping opening at one end and including a bottom wall and longitudinally extending side walls and an end wall extending between the bottom and side walls at the other end of the container, pivot means pivotally mounting the upper corners of the container side walls adjacent the dumping opening to the upper ends of the frame supporting walls, cam follower means on the container adapted to coact with cam track means for tilting the container with respect to the frame, and hold-down means on the frame adapted to coact with hold-down track means for preventing tipping of the frame and its supporting wheels.

11. In combination, hold-down track means and a dump car, the dump car including a plurality of supporting wheels, a frame, means journalling the wheels on the frame, supporting walls extending upwardly from the frame, a container having a dumping opening at one end and including a bottom wall and longitudinally extending side walls and an end wall extending between the bottom and side walls at the other end of the container, pivot means pivotally mounting the upper corners of the container side walls adjacent the dumping opening to the upper ends of the frame supporting walls, and hold-down means on the frame adapted to coact with the hold-down track means for preventing tipping of the frame and its supporting wheels.

12. In combination, cam track means and hold-down track means and a dump car, the dump car including a plurality of supporting wheels, a frame, means journalling the wheels on the frame, supporting walls extending upwardly from the frame, a container having a dumping opening at one end and including a bottom wall and longitudinally extending side walls and an end wall extending between the bottom and side walls at the other end of the container, pivot means pivotally mounting the upper corners of the container side walls adjacent the dumping opening to the upper ends of the frame supporting walls, cam follower means on the container adapted to coact with the cam track means for tilting the container with respect to the frame, and hold-down means on the frame adapted to coact with the hold-down track means for preventing tipping of the frame and its supporting wheels.

HARRY J. HICK.